Figure 1:
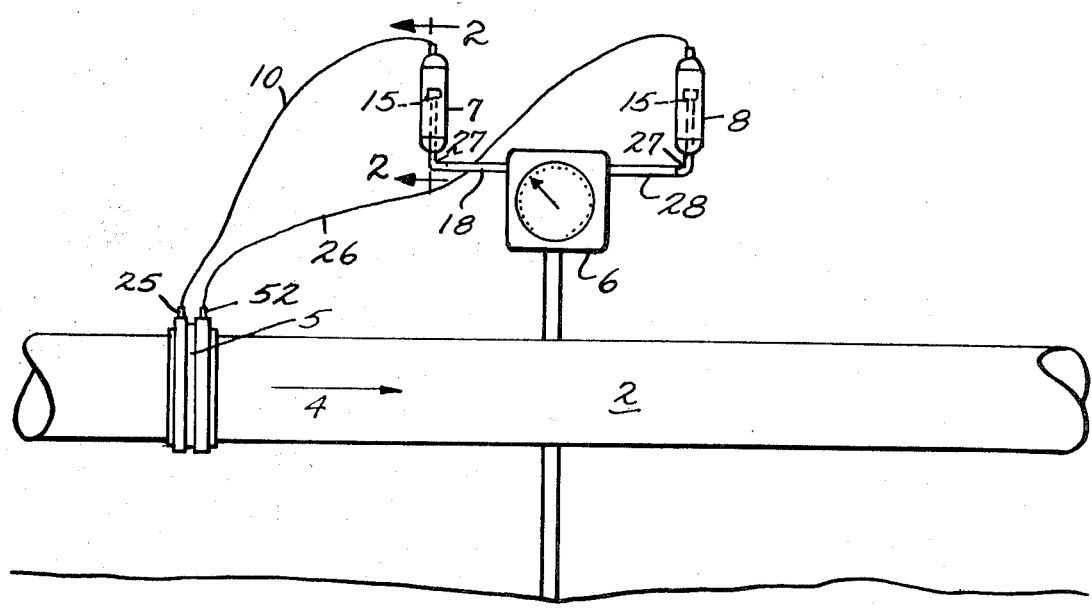

United States Patent

Fussell

[15] 3,645,138

[45] Feb. 29, 1972

[54] METER FOR MEASURING THE FLOW OF GAS

[72] Inventor: Calvin Raymond Fussell, Kermit, Tex.

[73] Assignee: W. L. Jones, Jr., Odessa, Tex. a part interest

[22] Filed: July 9, 1969

[21] Appl. No.: 840,271

[52] U.S. Cl. ........................................... 73/401, 73/392
[51] Int. Cl. ..................................................... G01l 7/18
[58] Field of Search ........... 73/401, 392; 220/85 VS, 85 VR; 137/179, 197; 55/178

[56] References Cited

UNITED STATES PATENTS

| | | | |
|---|---|---|---|
| 2,997,880 | 8/1961 | Cook et al. | 73/401 |
| 1,354,023 | 9/1920 | Cornett et al. | 73/401 |
| 1,918,635 | 7/1933 | Cummings | 73/401 |
| 1,949,627 | 3/1934 | Rockwell | 73/401 |
| 2,475,602 | 7/1949 | Forst | 73/401 |
| 3,298,615 | 1/1967 | Echols | 55/178 |

*Primary Examiner*—Louis R. Prince
*Assistant Examiner*—Daniel M. Yasich
*Attorney*—Cushman, Darby & Cushman

[57] ABSTRACT

A mercury trap apparatus used in connection with a differential pressure meter comprising a plurality of mercury trap receptacles, each of the mercury trap receptacles having a pipe with a T-shaped nozzle inserted therein, and extending a predetermined distance into the enclosed area of the mercury trap receptacle; each of the mercury trap receptacles are connected to a gas pipeline by a high-pressure conduit and with the trap receptacle pipe being connected to a mercury differential pressure meter by a connector conduit.

7 Claims, 2 Drawing Figures

PATENTED FEB 29 1972  3,645,138

WEEP HOLES 11

INVENTOR
CALVIN RAYMOND FUSSELL

BY Cushman, Darby & Cushman
ATTORNEYS

METER FOR MEASURING THE FLOW OF GAS

This invention relates to a mercury trap apparatus which is used in connection with a mercury meter used for measuring the volume of natural gas flowing through a pipeline and, particularly, to an improved mercury trap apparatus.

Mercury-type meters are well known and are used in the measurement of gas flow in gas pipelines. Mercury is used in the meters to operate the gauge which indicates the volume of the gas flow in the pipeline. One example of such a meter is of the type that has a manometer. A manometer has a U-tube containing mercury with the ends of the U-tube being connected to a pipeline at an orifice sleeve so that one leg of the U-tube is in communication with the gas on the upstream side of the sleeve and the other leg is in communication with the gas on the downstream side of the sleeve.

Gas flow in pipelines is not constant causing the pressure of the gas to variably increase or decrease. One situation that occurs to change the pressure of the gas is when there is a sudden surge of gas in the pipe. Another situation that changes the pressure of the gas is when there is a gas line leak or break at a point before the gas reaches the meter. The pressurized gas then flows backwards as it seeks to reach an area where the pressure is less.

These sudden surges of gas flow are of sufficient magnitude to blow the mercury out of the meters and trap apparatus, currently being used, into the pipeline causing the mercury to be lost. This loss of mercury can run to a considerable expense since the meters, depending on their size, generally require from 7 to 13 lbs. of mercury. Besides being blown out of the meter the mercury can also be agitated in the mercury trap by the pressurized gas, causing the mercury to be stirred or beaten. When mercury is stirred or beaten the moisture present in the apparatus forms a thick muddylike material which causes incorrect meter readings if the agitated mercury is reused in the meter.

The present invention has overcome these problems in that it provides a simple device to prevent the loss of mercury from the meter under blowout or feedback conditions and prevents the contamination of mercury by agitation.

The device also has additional benefits, in that it automatically refills the meter after an abnormal surge of pressure has occurred so that the meter will not have to be reset or recalibrated thus saving time and labor costs. The automatic refilling results in a more accurate checking of the flow of gas in the line since the meter would give accurate readings due to the fact that it would use uncontaminated mercury.

The simple construction and ease of manufacture causes the present invention to be economical in fabrication, manufacture and maintenance. The invention also is an improvement over previous mercury saving devices, in that not only does it protect the meter against overloads or blowouts of gas pressure, it also provides protection where you have a flowback or feedback of gas in a pipeline.

Other objectives and advantages will be apparent as one skilled in the art will readily understand from the appended claims.

Figure 2:
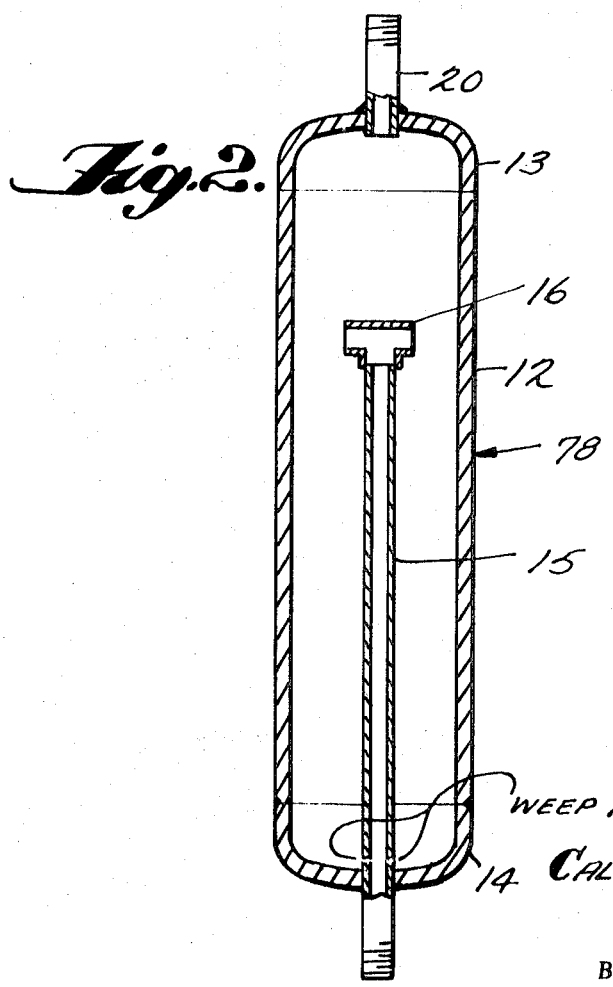

FIG. 1 shows a front elevation view of a meter and mercury traps of the invention; and FIG. 2 shows a cross-sectional view of the mercury trap taken along line 2—2 of FIG. 1.

The invention contemplates an improvement in mercury traps which prevent the passage of foreign materials into the mercury column of the meter and prevents loss of mercury into the gas line, because of the changes in pressure in the gas line.

The novel apparatus described is preferably formed of a metal such as steel or steel alloys which possess strength in a thin section to resist ordinary stresses. This type of structure is further characterized by a lightness in weight without loss of strength and can be fastened in a strong and permanent union. However, it is recognized that aluminum, alloy metals or plastics may be used to good advantage and may be used in whole or in part in the novel structure.

FIG. 1 discloses an embodiment of the invention showing the flow of gas in a pipeline 2 in the direction indicated by the arrow 4. When the gas pressure flow in the direction of the arrow is increased to a point which overloads the gas meter it will cause mercury located in orifice meter 6 to be pushed or blown out of the meter. Orifice meters consist of an orifice and a differential measuring device which indicates or records the flow directly or indirectly. An example of various types of orifice meters are shown and described in "Chemical Engineers Handbook," second edition, published by McGraw-Hill Co., 1941, pages 2040 to 2044. When a high-pressure blowout occurs, the increased gas pressure is forced through the sleeve connector 25 located in sleeve 5 into a high-pressure conduit 10 which is connected to a closed mercury trap receptacle 7. The mercury trap receptacle 7 is connected to a meter 6 by a meter connector conduit 18. The mercury or liquid in the meter is necessary to have the gauge on the meter reflect the volume of gas flow. The meter 6 is a standard meter which is used in the field and generally varies only as to size and not to structure. The invention can be attached to any normal mercury pressure meter. When the gas pressure increases to a point which overloads the mercury meter 6, then the mercury from the meter is pushed or blown from the meter 6 through meter connector conduit 28 into the mercury trap receptacle 8, where it is retained and later fed back to meter 6 by gravity feed.

In the preferred embodiment the closed mercury trap receptacles 7 and 8 which are identically constructed are cylindrically shaped, although the receptacles can be rectangular or have any desired shape. As shown by FIG. 2, the mercury trap receptacle 78 is comprised of cylinder member or case 12, a top cap 13 and a base cap 14. The top cap 13 and base cap 14 are preferably welded to the cylinder member or case 12, however, if desired, the top cap 13 and/or the base cap 14 can be removably connected to the cylinder member 12 by a threaded screwing engagement, force fitting or coupling means. Any of these cap removal or fastening means can be used to enable easy maintenance and replacement of mercury trap receptacle 78. A pipe 15 is inserted through the base cap 14 of the cylinder for a predetermined distance into mercury trap receptacle 78. The pipe 15 is preferably centered in the mercury trap receptacle. The pipe is generally of ¼-inch diameter since that is the standard connection in the gas field. However, any size pipe can be used. The pipe 15 can be welded to the base cap 14 so that it is secured to the base cap. If desired, the pipe can be secured to base cap 14 by other suitable means, such as by screwing or adhesives. It is noted that the use of these suitable means is not meant to exclude other usable methods. A T-shaped deflector head or nozzle 16 is mounted on top of pipe 15 by welding or screwing means. However, the cap can be mounted by using adhesives, force fitting, knurling or other suitable fastening means. If desired, the pipe can be integrally made so that the T-shaped deflector head or nozzle is simply a part of pipe 15. A U-shaped or V-shaped deflector head or nozzle can be utilized in the invention, if desired. Any other shaped deflector head can be used which will force the pressurized mercury against the inner sidewalls of the cylindrical case 12. As the mercury is forced from meter 6 it is forced through meter connector conduit 28 past the receptacle pipe-connecting means 27 up into pipe 15. As the mercury is forced up into pipe 15 it comes in contact with the inner surface of the top of the deflector head or nozzle 16 and is forced outward from the deflector head or nozzle against the inner walls of the cylindrical case 12. Since the specific gravity of the mercury is greater than that of the pressure of the gas, the mercury will fall to the bottom or base cap 14 of the mercury trap receptacle, where it will encounter a plurality of spaced apertures or weep holes 11, preferably one-eighth inch in diameter, in pipe 15. If desired, the apertures can be larger or smaller than one-eighth inch in diameter depending on the size of the pipe used and the desired rate of flow of the mercury or liquid desired. The aperture or apertures 11 are positioned near the bottom inner surface of the receptacle or base cap 14 so that the mercury cannot form a pool at the bottom of the receptacle. When the blowout pressure of the gas has subsided the mercury will seep through the apertures or weep holes 11 into pipe 15 and flow back into the meter 6, returning back over the same course that it followed when it was blown out of meter 6. The pipe 15 can be threaded so that pipe connecting means 27 will provide connection onto meter connector conduit 28, or can be secured to the pipe connecting means 27 by other suitable means, such as welding. A high-pressure connector conduit 20 is inserted through the top cap 13 of the mercury trap receptacle 78 to allow connection of the high-pressure conduits 10 and 26 which provide the entrance or exit means of the pressurized gas, depending on the direction of flow of the gas. The high-pressure connector conduit 20 is preferably welded onto top cap 13 but it can be secured to mercury trap receptacle 78 in any of the ways that pipe 15 is secured or fastened to base cap 14. The high-pressure connector conduit 20 can be threaded so that it fits onto high-pressure entrance or exit conduits 10 and 26, or may be secured to the conduits by any suitable means. Under blowout conditions, when the high-pressure connector conduit 20 is fitted to high-pressure conduit 26, the gas flows back through sleeve connection 52 into orifice flange or sleeve 5, where it rejoins the flow of gas in pipe 2.

If the main gas line 2 should have a leak or break in it before the flow of gas reaches the orifice sleeve 5, of the main line, a flowback will be caused which means that the gas would be flowing in the opposite direction in which it normally flows.

This opposite directional pressure would cause the gas to flow through orifice sleeve connection 52 into and through high-pressure conduit 26. The gas flow would continue from the high-pressure conduit 26 through high-pressure connector conduit 20 into mercury trap receptacle 8. The pressurized gas would then force through pipe 15 and meter connector conduit 28, where it would contact the mercury in meter 6.

The mercury is then forced or blown out of meter 6 through meter connector pipe 18 and forced up through pipe 15, where it is deflected by the T-shaped deflector head or nozzle 16 against the inner side walls of the mercury trap receptacle 7. The specific gravity of the mercury would cause it to fall to the bottom of mercury trap receptacle 7, where it would collect in the base cap 14.

The pressurized gas would travel from mercury trap receptacle 7 down high-pressure conduit 10 and through orifice sleeve 5, where it would be discharged into pipeline 2 and continue its flow.

When the gas pressure subsided, the mercury would trickle or flow through a plurality of apertures or weepholes 11, which are located in pipe 15 near the inner surface of base cap 14.

Although the present invention has been disclosed and illustrated in conjunction with various embodiments, it is to be understood that modifications and variations may be resorted to without departing from the spirit of the invention as those skilled in the art will readily understand. Such modifications and variations are considered to be within the purview and scope of the present invention as defined by the appended claims.

I claim:
1. A liquid trap apparatus for use in connection with a differential pressure meter having fluid therein comprising:
   a plurality of closed liquid trap receptacles; each of said liquid trap receptacles having a first and second opening and each having pipe inserted therein and extending through the second of said openings into that receptacle, each said pipe having a deflection nozzle mounted on one end within said receptible,
   each said liquid trap receptible comprising a substantially cylindrical case, a top cap secured to said substantially cylindrical case, said top cap having first connector means secured thereto, and connected to said first opening, a base cap secured to said substantially cylindrical case with said pipe inserted therein secured thereto, said pipe extending a predetermined distance up into said cylindrical case,
   a plurality of high-pressure conduits; each of said high-pressure conduits having one end connected to said first connector means in said liquid trap receptacle and the other end connected to a pipeline, and
   at least one meter connecting conduit; each said meter connecting conduit having one end connected to the other end of said pipe and means connecting the other end of the meter connecting conduit to said differential pressure meter so that fluid forced from said meter out one of said meter connecting conduits is trapped in the receptible connected to that meter connecting conduit.

2. A liquid trap apparatus used in connection with a differential pressure meter as claimed in claim 1 wherein said deflection nozzle is T-shaped.

3. A liquid trap apparatus used in connection with a differential pressure meter as claimed in claim 1 wherein said liquid trap apparatus is a mercury trap apparatus.

4. A liquid trap apparatus used in connection with a differential pressure meter as claimed in claim 1 wherein said differential pressure meter is a mercury differential pressure meter.

5. A liquid trap apparatus used in connection with a differential pressure meter as claimed in claim 1 wherein each said pipe has a plurality of apertures located adjacent the bottom inner wall of said base cap for permitting said fluid trapped in the receptacle into which that pipe extends to return to said meter via said apertures, said pipe, and the pipe connecting conduit connected to that pie.

6. A liquid trap apparatus used in connection with a differential pressure meter as claimed in claim 1 wherein said top cap and base cap are substantially hemispherical in shape.

7. A liquid trap apparatus used in connection with a differential pressure meter as claimed in claim 1 wherein said top cap and said bottom cap are removable from said substantially cylindrical case.

* * * * *